March 17, 1942.    C. S. JORDAN    2,276,581
EGG CLEANING MACHINE
Filed June 12, 1939    2 Sheets-Sheet 1
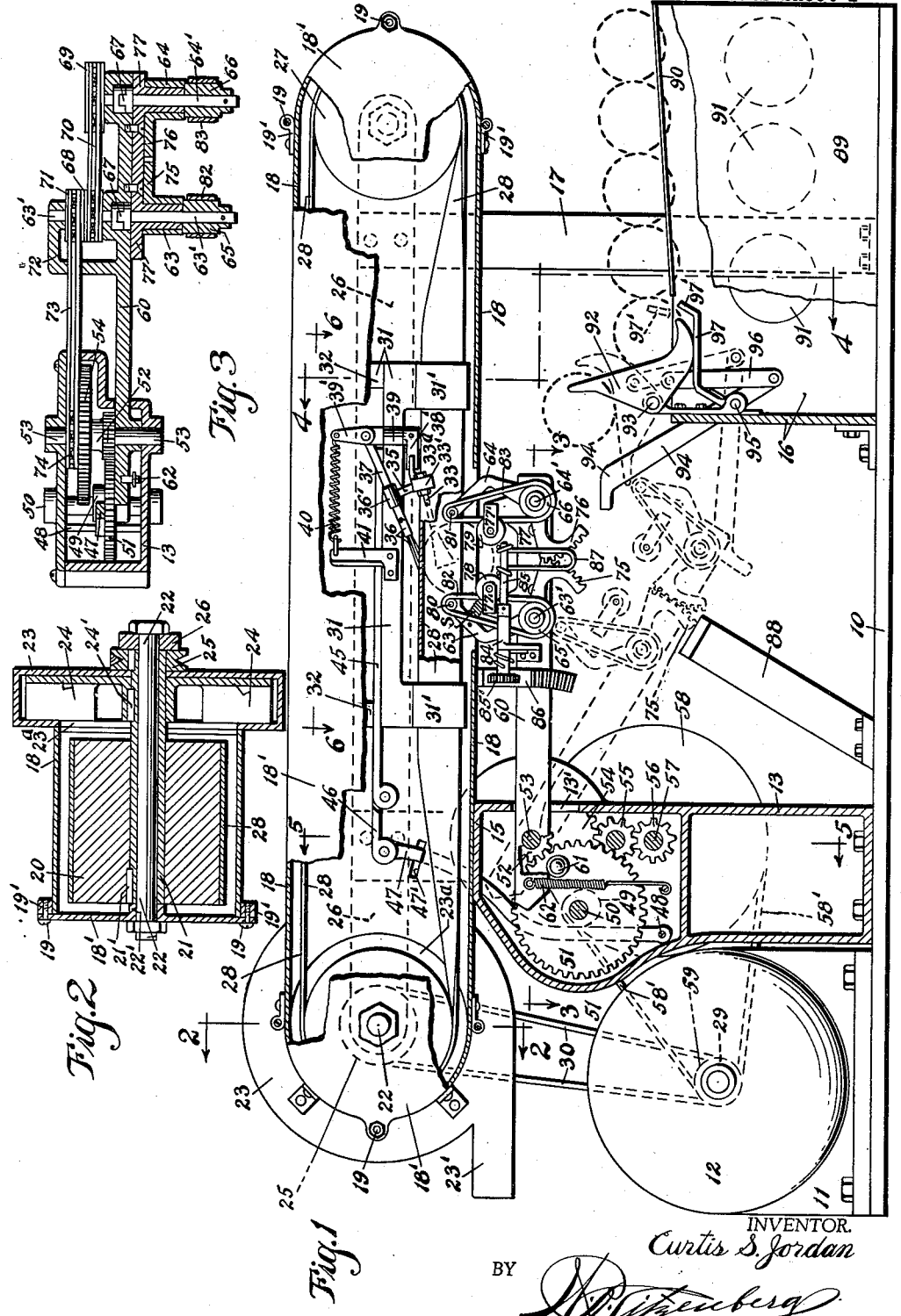
INVENTOR.
Curtis S. Jordan
BY
ATTORNEY.

March 17, 1942.　　　C. S. JORDAN　　　2,276,581
EGG CLEANING MACHINE
Filed June 12, 1939　　　2 Sheets-Sheet 2
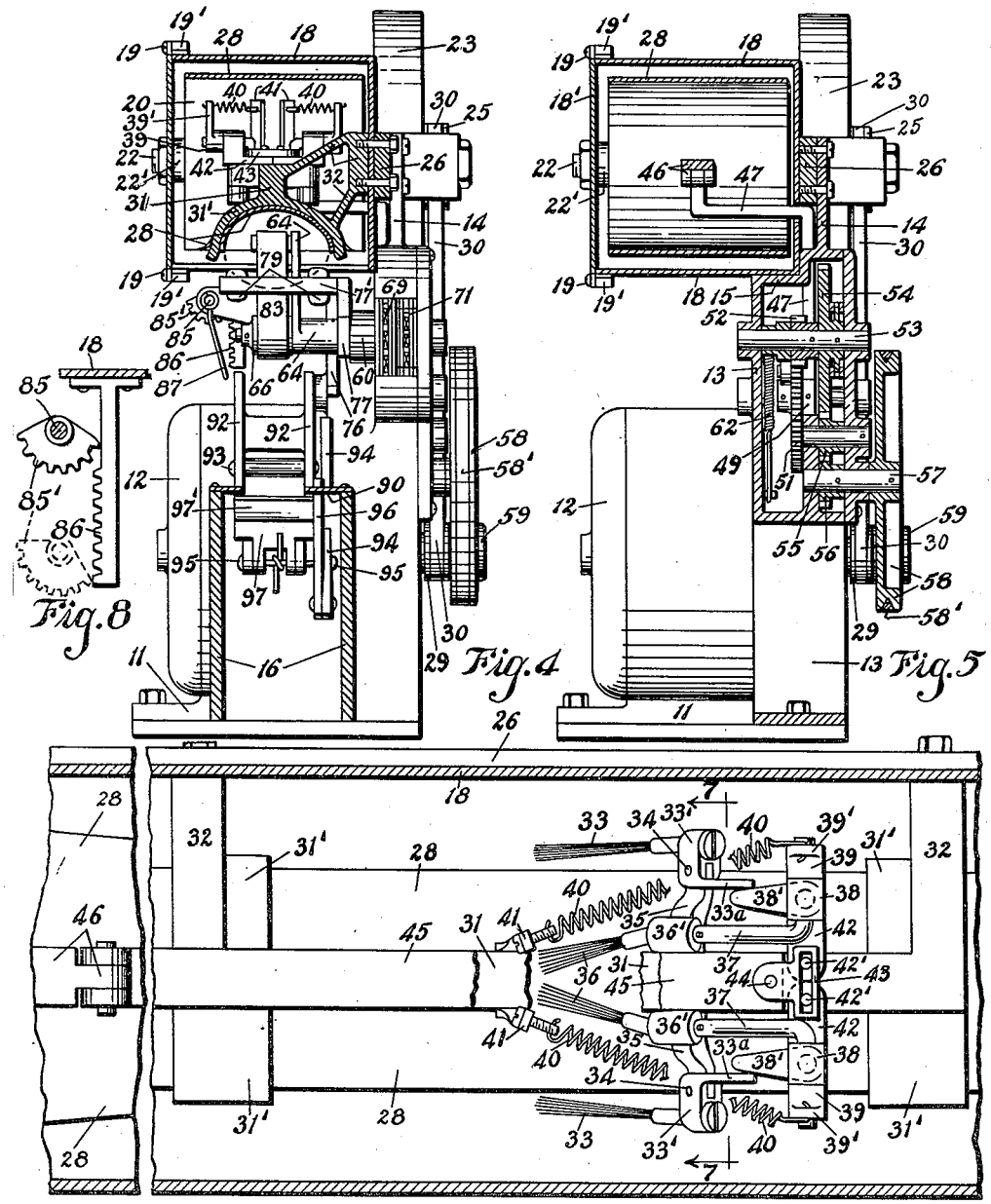
INVENTOR.
Curtis S. Jordan
BY
ATTORNEY.

Patented Mar. 17, 1942

2,276,581

UNITED STATES PATENT OFFICE 2,276,581

EGG CLEANING MACHINE

Curtis S. Jordan, Glendale, Calif.

Application June 12, 1939, Serial No. 278,640

8 Claims. (Cl. 51—135)

My invention relates to an egg cleaning machine, and it has among its salient objects:

To provide a machine for cleaning eggs with a dry process, as distinguished from any sort of washing process.

To provide an egg cleaning machine having means for supporting and for revolving an egg about its longitudinal axis, with its surface exposed for the cleaning process;

To provide in such a machine means for supporting and revolving the egg in which the revolving means acting downwardly against one side of the egg turns slightly faster than the revolving means acting on the other side of the egg, whereby to prevent the egg from moving out of its holding means;

To provide mechanism for delivering the eggs, one by one, to said supporting and revolving means;

To provide means for automatically delivering the cleaned eggs from said holding and revolving means;

To provide in an egg cleaning machine, a moving cleaning member adapted to be moved upon the surface of an egg in such a way as to clean the surface thereof, said cleaning member being adapted to conform to the curvature of the surface of the egg;

To provide in such a machine a cleaning member in the form of an endless belt having a cleaning surface of abrasive character, with means for driving it, said member being adapted to engage the surface of the egg and to conform thereto as it moves upon the egg;

To provide in an egg cleaning machine having an endless belt-like cleaning member, means for flexing one lap of said member as it moves therethrough to conform to the curvature of the egg held thereagainst;

To provide in combination with an endless, belt-like, flexible egg cleaning member, with means for driving it, additional means movable yieldingly upon the upper surface of said flexible member above the egg being cleaned to insure proper contact with all parts of the surface of the egg, thus insuring that any unevenness in the surface of the egg will be properly engaged by said cleaning member.

And, in general, to provide an improved egg cleaning machine which automatically feeds the eggs one by one to a holding and turning device, with a power driven egg cleaning member adapted to engage and move upon the surface of the egg as it is supported and turned by said holding and turning device.

In order to explain my invention more in detail, I have shown one practical embodiment thereof on the accompanying sheets of drawings, which I will now describe, and in which:

Figure 1 is a side elevation of an egg cleaning machine embodying my invention, with parts broken out and shown in section to better disclose the working parts, and with parts shown in different moved positions;

Figure 2 is a vertical sectional view taken on line 2—2 of Figure 1;

Figure 3 is a horizontal sectional view taken on line 3—3 of Figure 1;

Figure 4 is a vertical sectional view taken on line 4—4 of Fig. 1;

Figure 5 is a vertical sectional view taken on line 5—5 of Fig. 1;

Figure 6 is an enlarged plan view looking down upon the belt-like cleaning member, at 6—6, Fig. 1, showing pressure fingers thereover and with parts broken away;

Figure 7 is a detail view, taken on the line 7—7 of Fig. 6; and Figure 8 is a detail showing of a rack and segmental gear.

Referring now in detail to the drawings, my invention as here shown for explanatory purposes is built upon a base 10, with upstanding supporting members for the various parts. A member 11, for supporting a motor 12; a vertical housing and supporting member 13, for housing certain gears and operating parts, again referred to, with an upstanding web or arm 14, and shoulder 15, as seen in Fig. 5; and with a box or case 16, for supporting the egg feeding mechanism, again referred to; and with a further upstanding supporting end member 17.

Supported upon the shoulder 15 and the web 14, of the housing member 13, at one end, and by the upper end of the member 17, is a long case or housing 18, having a cover plate 18' secured in place thereon by screw bolts, as 19, 19, lugs 19' being shown on the case 18 for that purpose.

Mounted in one end of the long case 18, as seen in Fig. 2, is a drum 20, on a sleeve 21, to which it is keyed, as at 21', which sleeve 21 rotates on a shaft 22, having its outer end bearing 22' in the cover plate 18. On the back side of this end of the case or housing 18, is a fan extension or housing 23, in which is a fan 24, keyed on said sleeve 21, as at 24', to be driven thereby with the drum 20, on said shaft 22, said sleeve 21 being provided with a driving pulley 25 on its outer end, as seen in Fig. 2.

A connecting bar or member 26 is shown extended from the rear end of said shaft 22, and connected with the upstanding web portion 14, to the other end of said long case, and is secured to the upper end of the member 17. The fan housing 23 is shown open into the end of the long housing 18, as at 23a, and is intended to draw dust out of said long housing, again referred to, and to discharge it through the fan outlet spout 23'.

Mounted in the other end of said long housing or case 18, is another drum 27, and on these two drums 20 and 27 is an endless belt-like cleaning member 28, having an abrasive work surface, something like sand paper, and which is flexible and can be flexed transversely to conform to the surface of an egg, as the lower lap thereof is brought into engagement with the egg, as hereinafter referred to.

From a pulley 29, on the motor 12, a belt 30 is extended to the pulley 25, on the end of the shaft 22, for driving the drum 20 and said cleaning belt or member 28.

Mounted in said long housing or case 18, is a member 31, having at its opposite ends downwardly extending arched portions, as 31', 31', and under which the lower lap of said endless belt-like cleaning member passes, as indicated in Fig. 4, where said part 31' is shown in section, said member 31 being supported by means of bracket extensions, as 32, 32, and secured through the wall of said member 18 to the long bar or member 26, as will be seen in Figs. 1 and 4, at the section line 4—4.

Mounted upon said member 31, above said cleaning belt member 28, are four flexible, brush-like pressure members or fingers, as 33, 33, and 36, 36, movably mounted and held to bear yieldingly down upon the top surface of said flexible cleaning member so as to press it upon the surface of the egg and make sure that any uneven places are engaged by said cleaning member. These pressing members are supported and connected to be moved laterally, as well as up and down yieldingly. The outer members 33, 33, are mounted in pivoted members 33', 33', to turn on the pivot pins 34, 34, in the ends of the arched member 35, as seen in Fig. 7. The inner pressure members 36, 36, are connected to the ends of pivoted arms 37, 37, bent at their anchored ends and extended through bearing members 38, 38, also pivoted to turn, and having forwardly extended cam fingers 38', 38', positioned to engage the rearwardly extending portions 33a, 33a, of the members 33', 33', as seen in Fig. 6. Rollers 36', 36', are shown on the ends of said pivoted arms 37, 37, to rest on the arched member 35, to guide and support said members in their movements and to keep the pressure members from dropping down too far when there is no egg under the belt or cleaning member.

On the outer ends of said pivoted arms 37, 37, are members 39, 39, having the upstanding lug portions 39', 39', to which are attached the ends of two coiled springs 40, 40, the forward ends of which are attached to two upstanding members 41, 41, secured to the sides of the member 31, as seen in Figs. 1 and 6.

The members 38, 38, have side extensions 42, 42, with pins 42', 42', in their ends, over which fits a pull yoke 43, pivotally connected at 44 with an operating bar or member 45, extended along the top of the member 31, as indicated in Fig. 1, with a hinged short section 46, connecting it with a lever 47, which is extended laterally through a slot 47' and down to a pivot connection at 48, in the housing structure 13, as seen in Fig. 1. A cam 49, on shaft 50, in the housing 13, intermittently engages said lever 47 and moves it rearwardly, also moving the bar or member 45, and through the pull yoke 43, turns the members 38, 38, to move the cam fingers 38', 38', and rock the members 33', 33', and their pressure brushes 33, 33. This movement also moves the levers or arms 37, 37, about the axes of the members 38, 38, thereby also moving pressure members 36, 36, laterally. The springs 40, 40, being connected to the upper ends of the members 39', 39', puts tension forwardly on said members, moving the arms 37, 37, yieldingly downwardly, and inasmuch as said coiled springs 40, 40, are connected at the outer ends of said pivoted arms 47, 47, there is a tension operating to turn said members 38, 38, on their axes, and to turn their extensions 42, 42, again to alinement, returning the pull yoke 43 and bar member 45, back to their normal positions before being moved outwardly by the cam member 49. Thus said pressure brushes or members 33, 33, and 36, 36, are moved and yieldingly held down upon the top of the lower lap of the endless cleaning member, above the egg being cleaned, and thus insuring perfect engagement of said cleaning member with all of the surface of the egg as it is turned thereunder, said cleaning member being curved or formed by the end portions 31', 31', of the member 31, to fit closely in engagement with the upper exposed surface of the egg, as it is held and turned on its longitudinal axis, in a manner to be described.

Mounted in the housing 13, on the shaft 50, which operates the cam 49, is a gear 51, in mesh with a pinion 52, on shaft 53, on which is also a larger gear 54, which meshes with a pinion 55, which is in mesh with another pinion 56, on shaft 57, on the outer end of which is a large pulley 58, over which runs a belt 58', to another small pulley 59 on the motor shaft with the pulley 29, before referred to. Thus from the motor pulley 59, belt 58', pulley 58, shaft 57, pinion 56, pinion 55, gear 54, shaft 53, pinion 52, gear 51 on shaft 50, which carries the cam 49, we have a mechanism for intermittently operating a pivoted arm or lever 60, pivoted on the shaft 53, with part broken out to expose the pinion 52, and the short end of which arm 60 is intermittently engaged by a cam member or roller 61, on gear 51, and rocked to move its long end down to the broken line position shown in Fig. 1. A spring 62 operates to yieldingly return said arm or lever to its raised position, as shown in full lines.

This pivoted arm or lever 60 carries at its free end an egg holding and turning mechanism adapted to receive an egg, close upon it, raise it into position to be engaged by the endless cleaning member, and to rotate said egg while in engagement with said cleaning member. This cleaning mechanism is shown in full lines in its operating position, holding an egg in position to be cleaned. In light broken lines, the egg holding and turning mechanism is shown in its down position, ready to receive an egg to be cleaned.

This mechanism is shown in enlarged sectional view in Fig. 3, taken on line 3—3 of Fig. 1. It consists of two arms 63 and 64, having their lower ends pivotally mounted on two shafts 63' and 64' on which are two pulleys, designated respectively 65 and 66, and driven by said shafts. Shafts 63' and 64' are jointed, as at 67, to facilitate the removal of these parts, when desired. On the other ends of said shafts, are two sprockets 68 and 69, sprocket 69 being larger than sprocket 68, and the two being connected by a sprocket chain 70, as seen in Fig. 3. On shaft 63' is a second sprocket 71, with a bracket arm 72 to form a supporting bearing for said shaft. A sprocket chain 73 connects said sprocket 71 with another sprocket 74 on the shaft 53, at the pivoted end of said arm 60. Said arm 60, it will be noted, Fig. 1, extends through a vertical slot or opening 31' in the case 13. The arms 63 and 64 have formed in connection with their hub portions two toe-like extensions terminating in two intermeshing racks, designated 75, 76, as indicated, for moving said arms together. Said arms 63 and 64, with their shafts 63' and 64', are supported in a carrying plate or member 77, easy to detach from the end of the arm 60. This plate 77, is provided with two upwardly and outwardly extending arms or portions, as 77', at its opposite ends, for supporting four egg supporting wheels, as 78, 78, and 79, 79, at opposite ends of the egg, as will be understood from Figs. 1 and 4. The upper ends of the arms 63 and 64 are provided with pulleys, 80 and 81, with belts 82 and 83, running over pulleys 65 and 80, and 66 and 81, respectively, and movable toward and from each other, as said arms are rocked to the positions indicated in light broken lines in Fig. 1. A small coiled spring S, Fig. 1, serves to move said arms yieldingly to their closed, or egg holding position.

Said belts 82 and 83, which engage and turn the egg, are driven from shaft 53, on the pivot shaft for the arm 60, and from a sprocket 74 thereon, as seen in Fig. 3, thus permitting said arm 60 to be raised and lowered without interfering with the drive of said egg holding and turning belts 82 and 83. Said belts are driven in opposite directions, and belt 82, is run slightly faster than belt 83, because of the difference in the size of the driving sprockets 68 and 69, belt 82 engaging the egg in a downward movement contact, while belt 83 engages the egg with an upward movement contact. This turns the egg in its longitudinal axis and as the down belt 82 is turning slightly faster, the tendency is to keep the egg from raising out of the cradle or holder formed therefor by the wheels 78, 78, at one side, and 79, 79, at the other side, and by the belts 82 and 83, at opposite sides thereof.

Mounted on the side of said arm 60, is a supporting bearing bracket 84, for a shaft 85, having on its end a segmental gear 85', as seen more clearly in Fig. 8. There is shown a coiled spring 85a on the hub portion of said segmental gear 85' which normally returns it to the position shown in full lines in Figs. 4 and 8, when free of the rack 86, shown suspended from the under side of the case 18, said rack being positioned to be engaged by said segmental gear as the arm 60, carrying the egg holding and turning mechanism is moved to the down position, indicated in light broken lines in said Fig. 1. At the opposite end of the shaft 85 is a wire loop 87, mounted to be intermittently revolved to move up under the egg at a predetermined time to discharge the egg from the egg holding and turning mechanism, as said mechanism starts down to the down, or egg-receiving position. Said discharge loop 87 moves only a partial turn, to discharge the egg, and as soon as the segmental gear 85' clears the teeth of the rack 86 at the lower end thereof, the spring 85a on said segmental gear hub, quickly turns said gear and said loop 87 to normal position, as shown in said Figs. 4 and 8. As said arm 60 is moved to its up position, carrying said segmental gear 85' and the egg holding mechanism with it, the segmental gear 85' moves from its down position, indicated in light broken lines, Fig. 8, to the up position shown in full lines in said Fig. 8, the rack being fixed. Thus the egg ejecting mechanism is actuated as said arm 60 starts to move downwardly and as the segmental gear is moved into mesh and given a partial turn by the fixed rack 86.

An upstanding member 88, on the base 10, Fig. 1, serves to engage the lower end of the rack 75, also in mesh with rack 76, on the egg holder, as said arm 60 and egg holder moves down to the position shown in broken lines, Fig. 1, and moves said racks so as to open the arms 63 and 64, with their egg engaging belts 82 and 83, to receive the egg, as clearly indicated in said Fig. 1.

I will now describe the egg feeding means which is supported in the box or case 16, having the sides, as 89, and top, as 90, said top 90 being open, as will be seen in the sectional view, Fig. 4, whereby the eggs roll down said top, in the manner indicated in Fig. 1, where the eggs are indicated in light broken lines, with electric lamps 91 within the case under the eggs, whereby to make inspection of the eggs convenient and effective as they move to the feeding member 92, pivoted at 93, and consisting of two spaced members, seen in Figs. 1 and 4. An operating arm 94, is pivoted at 95, and connects with a link 96, which is connected at its upper end to the side of one of the members 92, so that as the egg holding and turning mechanism moves to its down, egg-receiving position, the member 64, Fig. 4, engages said operating arm 94, and moves the egg feeding member 92, to the position indicated in light broken lines, which rolls the egg into the cradle formed by the wheels 78, 79, and the belts 82 and 83. A spring-moved limit member 97, pivotally supported at 95, has an upturned toe 97', which follows the egg feeding member 92 up to the position indicated by the broken line position of said toe 97', where it acts as a stop for the following egg until the egg feeding member 92 is again returned to the receiving position, indicated in full lines in said Fig. 1.

The use and operation of my invention as here shown and described for explanatory purposes, may be briefly described as follows:

The motor 12, through the belt 30, is driving the endless, flexible, egg-cleaning belt or member 28, which runs on the pulleys 20 and 27, in the opposite ends of the long case 18. The lower lap of said endless belt cleaner runs under the arched ends 31' of the member 31, thus arching said flexible egg cleaning member 28, as seen in section, Fig. 4. The pressure fingers or brushes 36 and 33, Fig. 6, are being moved in the manner described, to press lightly down upon the top of said lower lap of said endless cleaner belt, above the eggs, to make sure that said cleaner member is moved into all uneven surface spots on the egg, as the egg is supported and turned against the underside of said cleaning member, as before explained.

From the motor 12, the belt 58', drives the large pulley 58, and through the pinions and gears 57, 56, 54, 52 and 51, the arm 60, which carries at its outer end the egg holding and turning mechanism, is moved to the down position by the cam roller 61, on said gear 51, said mechanism being shown in open, egg-receiving condition in light broken lines in Fig. 1.

The eggs roll down the inclined top 90 of the case 16, to the feed member 92, which has already been moved from the full line position to the broken line position by the engagement with the operating lever 94 of the end of the egg holding and turning mechanism, and an egg is thus fed into the cradle formed by the small rubber wheels 78 and 79, at each end of the egg, and by the belts 82 and 83. The following egg on the top 90 is held by the toe 97' of the follow member 97, as before described.

As the cam roller 61, on gear 51, moves past the short end of the arm 60, the spring 62 raises the free end of said arm 60 to the up position, with the egg in position, as seen in light broken lines in the operating position, full lines, Fig. 1.

The belts 82 and 83, which operate against the oposite sides of the egg, moving in different directions, as before described, and belt 82 moving slightly faster than belt 83, turns the egg about its longitudinal axis and holds it in place with its upper surface exposed for engagement with the cleaning belt member, between the ends 31', 31' of the member 31, which flex the belt transversely to conform to the curved surface of the egg, as clearly indicated in the sectional view, Fig. 4. The driving mechanism for the egg turning mechanism is shown in Fig. 3, and has been described in detail.

The cam roller 61 on gear 51 determines the actuation of the arm 60 from the up or operating position, to the down or receiving position, and the start of the movement of said arm 60, also actuates the segmental gear for operating the egg discharging member 87.

Thus I have provided a practical egg cleaning mechanism in which eggs are fed automatically to a holding and turning mechanism, and said mechanism is moved to put said egg in engagement with a moving egg cleaning member, conforming to the surface of the egg, whereby to clean the entire surface thereof, with means for discharging the egg automatically from the holding and turning mechanism.

While I have shown and described in detail one practical embodiment of my invention, I am aware that many changes in the details of construction and arrangement here shown can be made without departing from the spirit of my invention, and I do not, therefore, limit the invention to the showing here made, except as I may be limited by the hereto appended claims.

I claim:

1. In an egg cleaning mechanism, an endless belt-like member of flexible, abrasive material, means for driving said member, means operable on one lap of said member for flexing it transversely to conform to the curved surface of an egg held thereagainst, and a pair of opposed driven belts for holding and turning an egg on its longitudinal axis against said endless member, and means for driving said belts.

2. An egg cleaning machine including, an endless belt-like member of flexible material having an abrasive surface, means for holding and driving said endless member, means operable on one lap of said member for flexing it transversely to conform to the curved surface of an egg, as said member passes through said flexing means, a movable member having thereon two driven flexible members for receiving and holding an egg therebetween and against said flexed cleaning members, said driven flexible members being operable to turn said egg on its longitudinal axis while in engagement with said endless cleaning member, and means for automatically moving said movable member from egg-receiving position to egg-cleaning position.

3. In an egg cleaning mechanism, a yielding egg cleaning member, means for operating it to move upon and conform to the surface of the egg therebetween to be cleaned, and a pair of oppositely driven belts for receiving and holding an egg against said cleaning member, said belts being operable for revolving said egg about its longitudinal axis while in engagement with said cleaning member.

4. In an egg cleaning mechanism, an egg cleaning member, said egg cleaning member having a work side adapted to conform to the curvature of the egg held thereagainst, means for operating said cleaning member transversely of the longitudinal axis of the egg, and means for receiving and holding an egg against said work side of said cleaning member as it is operated, said means including power driven members for revolving said egg about its longitudinal axis, said power driven means operating on one side of said egg being operated faster than those on the opposite side, whereby to retain said egg in said holding means.

5. An apparatus for cleaning eggs including a power driven means for holding and turning an egg on its longitudinal axis, said means operating faster on one side of the egg than on the other and in the opposite direction, and an endless flexible cleaning belt rotatably mounted to yieldingly engage and conform to the surface of the egg, and means for driving said cleaning belt.

6. A machine for cleaning eggs including means for holding and turning an egg about its longitudinal axis with its upper surface freely exposed, said supporting and turning means including revoluble members at opposite sides of the egg and in engagement therewith, means for driving said revoluble members in opposite directions, said driving means operating the revoluble members on one side of the egg faster than on the other and with a downwardly moving engagement with the egg, whereby to prevent said egg from rising, and cleaning means operable on the surface of said egg as it is turned.

7. An apparatus for cleaning eggs including a power driven means for holding and turning an egg about its longitudinal axis, said means operating faster on one side of the egg than on the other and in the opposite direction, an endless flexible cleaning belt having an abrasive surface to engage and clean an egg, means for driving said endless cleaning belt, and pressure means bearing lightly and yieldingly upon the upper surface of said cleaning belt over the egg to insure cleaning engagement of said cleaning belt with all parts of the surface of the egg being cleaned.

8. In an egg cleaning machine, an endless, belt-like member of flexible material having an abrasive surface, means for holding and driving said member, means operable on one lap of said member for flexing it to conform to the curved surface of an egg to be cleaned, means for automatically feeding an egg against the flexed portion of said member to be cleaned, said means being operable to revolve said egg against said cleaning member, and means for automatically discharging said egg away from said cleaning member.

CURTIS S. JORDAN.